United States Patent
Kwon (10) Patent No.: US 10,285,532 B2
(45) Date of Patent: May 14, 2019

(54) ESPRESSO COFFEE EXTRACTION DEVICE

(71) Applicant: MR.COFFEE CO., LTD., Seoul (KR)

(72) Inventor: Jang Ha Kwon, Cheongju-si (KR)

(73) Assignee: MR.COFFEE CO., LTD., Seoul (KR)

( * ) Notice: Subject to any disclaimer, the term of this patent is extended or adjusted under 35 U.S.C. 154(b) by 179 days.

(21) Appl. No.: 15/525,029

(22) PCT Filed: Jul. 23, 2015

(86) PCT No.: PCT/KR2015/007665
§ 371 (c)(1),
(2) Date: May 5, 2017

(87) PCT Pub. No.: WO2016/072589
PCT Pub. Date: May 12, 2016

(65) Prior Publication Data
US 2018/0279821 A1    Oct. 4, 2018

(30) Foreign Application Priority Data

Nov. 7, 2014  (KR) .......... 10-2014-0154718

(51) Int. Cl.
*A47J 31/36* (2006.01)
*A23F 5/24* (2006.01)
(Continued)

(52) U.S. Cl.
CPC .......... *A47J 31/36* (2013.01); *A23F 5/24* (2013.01); *A23F 5/26* (2013.01); *A23F 5/262* (2013.01); *A47J 31/0657* (2013.01); *A47J 31/52* (2013.01)

(58) Field of Classification Search
CPC ........ A47J 31/36; A47J 31/52; A47J 31/0657; A23F 5/262; A23F 5/26; A23F 5/24
See application file for complete search history.

(56) References Cited

U.S. PATENT DOCUMENTS 4,421,014 A * 12/1983 Vicker ............... A47J 31/38
99/289 P
4,602,558 A *  7/1986 Kaper ................ A23F 5/125
425/259

(Continued)

FOREIGN PATENT DOCUMENTS

KR    2009-0099197 A     9/2009
KR    2012-0019251 A     3/2012
(Continued)

*Primary Examiner* — Eric Keasel
(74) *Attorney, Agent, or Firm* — Maschoff Brennan (57) ABSTRACT

An espresso coffee extraction device includes an extraction piston driving unit having an extraction piston that, when coffee particles are supplied to a two-way cylinder via a coffee bean grinder to extract espresso coffee automatically, descends and injects hot water into the coffee with a strong pressure, thereby generating coffee liquid. A two-way cylinder driving unit moves leftward/rightward, continuously extracts coffee via a coffee extraction filter unit, and discharges coffee remnants to the outside after the extraction when the extraction piston ascends. The extraction device enables fully automatic extraction of coffee having the same quality as espresso extracted by baristas manually. The extraction device can be used with various types of expresso extractors as the main device of various types of fully automatic espresso extractors for use in factories, coffee shops, restaurants, homes, and offices, thereby enabling anyone to use the same conveniently and extract high-quality coffee.

7 Claims, 8 Drawing Sheets

(51) Int. Cl.
    *A23F 5/26*      (2006.01)
    *A47J 31/06*     (2006.01)
    *A47J 31/52*     (2006.01)

(56) References Cited

U.S. PATENT DOCUMENTS

| | | | | |
|---|---|---|---|---|
| 4,829,889 A * | 5/1989 | Takeuchi | ............ | A47J 31/0668 |
| | | | | 99/285 |
| 4,941,399 A * | 7/1990 | Zucchetti | ............ | A47J 31/3614 |
| | | | | 99/289 P |
| 5,855,161 A * | 1/1999 | Cortese | ............... | A47J 31/3633 |
| | | | | 99/289 P |
| 6,786,134 B2 * | 9/2004 | Green | ................. | A47J 31/3633 |
| | | | | 99/289 P |
| 9,021,938 B2 * | 5/2015 | Duvall | .................... | A47J 31/22 |
| | | | | 99/289 R |
| 9,259,115 B2 * | 2/2016 | Radhakrishnan | ... | A47J 31/3614 |
| 9,629,492 B2 * | 4/2017 | Giacomin | ............. | A47J 31/005 |

FOREIGN PATENT DOCUMENTS

KR   10-1262177 B1   5/2013
KR   10-1448387 B1   10/2014

\* cited by examiner

ESPRESSO COFFEE EXTRACTION DEVICE

TECHNICAL FIELD

The present invention relates to an espresso coffee extraction device, and more particularly, to an espresso coffee extraction device that enables fully automatic extraction of coffee with the same quality as that of espresso extracted manually by baristas, and thus significantly enhances quality and reliability of products and, therefore, meets various needs of consumers (users), resulting in high consumer satisfaction.

BACKGROUND ART

As is well known, coffee extraction methods have remarkably advanced. A Turkish leaching method utilizing hand-pouring, and individual extraction machines such as a hand drip, a machine drip, a Moka pot, a French press, siphon, and the like have been developed, followed by the development of espresso machines of a lever type, a piston type, a spring type, or the like, and, today, digital technology-combined automatic coffee machines with convenience of use can be found in shops and homes. Such continuously advanced coffee extraction methods are a driving force and a power source for coffee industry development.

Among the above-described coffee extraction methods, the espresso machine is a modern extraction method which extracts coffee within a short time using the pressure of a boiler and a motor. The invention and development of coffee machines, which are called the fruit of modern science, are the main reason why espresso represents modern coffee. This has enabled coffee operators to gain a foothold in further increasing economic value of coffee and consumers to enjoy more tasty coffee in a faster and more stable manner. In addition, such espresso machines greatly contribute to formation and recognition of a new professional group of baristas. People are crazy about this small, compact and sophisticated espresso machine. In addition, people are overwhelmed with admiration for the fact that delicious coffee is made within a very short time by several manual operations of a barista, such as a coffee receiving operation, a packing operation, a tamping operation, a holder alignment operation, and the like, which seem very simple and easy at first glance. Today, espresso machines are essential and core equipment commonly used in cafes or coffee shops all over the world.

This espresso coffee extraction device is designed to mechanically perform such a process of extracting espresso without manual techniques of well-trained baristas. This extraction device is designed to be used in combination with a boiler device for supplying hot water and a grinder device for grinding coffee beans, and the boiler or grinder device may be combined with this extraction device in various forms. However, the key to this technology is to automatically and readily extract high-quality espresso using a cylinder and a piston.

PRIOR ART DOCUMENTS (Patent Document 1) Korean Patent Application Registration No. 1262177 (May 2, 2013)
(Patent Document 2) Korean Patent Application Registration No. 0796015 (Jan. 11, 2008)
(Patent Document 3) Korean Patent Application Registration No. 1002461 (Dec. 13, 2010)
(Patent Document 4) Korean Patent Application Registration No. 0924447 (Oct. 26, 2009)

DISCLOSURE

Technical Problem

According to the present invention, operations of preparing for espresso extraction and extracting espresso by baristas, who are technicians, are mechanically performed using a cylinder and a piston, thereby reducing labor of baristas and greatly reducing occupational illness such as wrist injury caused by excessive hand movement, and the like. In addition, this espresso coffee extraction device is designed such that a handicapped person, the elderly, and the like can easily extract coffee to become a barista.

In a case in which an espresso extraction machine is manufactured using this extraction device, an espresso extraction machine for industrial, commercial, or home use, a vending machine, and the like may be manufactured such that this extraction device is combined with a boiler device and a grinder device in various forms, and a coffee extraction water purifier, or the like may be manufactured such that this extraction device is combined with a water purifier, or the like. The reason that espresso extractors can be manufactured in various forms is that this coffee extraction device can be readily and automatically operated by combining a machine principle and a program.

Technical Solution

In accordance with one aspect of the present invention, provided is an espresso coffee extraction device including a coffee extractor to automatically extract espresso, the coffee extractor including: an extraction piston driving unit to drive an extraction piston to descend when coffee particles are supplied to a two-way cylinder via a coffee bean grinder to push hot water into coffee at a high pressure, thereby generating liquid coffee; and a two-way cylinder driving unit to continuously extract coffee via a coffee extraction filter unit and discharge extracted coffee grounds to the outside, while moving leftward or rightward when the extraction piston driving unit ascends.

Advantageous Effects

As described above in detail, a coffee extractor according to the present invention includes a coffee bean grinder, a boiler, an extraction piston driving unit, a two-way cylinder driving unit, an extraction piston, and a coffee extraction filter unit.

According to the present invention having the above-described technical configuration, operation of a piston and a cylinder, a water supply method, an extraction pressure adjustment method, a temperature adjustment method, and the like may be automatically performed.

The present invention is characterized in that coffee with the same quality as that of espresso manually extracted by a barista may be automatically extracted by the above-described operations.

In addition, according to the present invention, espresso may be rapidly extracted by a two-way cylinder.

In addition, the present invention provides a highly efficient and solid espresso coffee extraction device.

Moreover, according to the present invention, espresso with sufficient crema may be completely prepared.

Due to the above-described effects, quality and reliability of products may be greatly increased, and thus a good image to consumers may be obtained by meeting various needs of consumers (users), which makes the present invention very useful.

Hereinafter, exemplary embodiments of the present invention will be described in detail with reference to the accompanying drawings to achieve these effects.

DESCRIPTION OF DRAWINGS

The above and other objects, features and other advantages of the present invention will be more clearly understood from the following detailed description taken in conjunction with the accompanying drawings, in which.

DESCRIPTION OF REFERENCE NUMERALS
FOR MAIN ELEMENTS OF THE DRAWINGS

100: coffee extractor
101: coffee bean grinder
102: boiler
110: extraction piston driving unit
120: two-way cylinder driving unit
130: extraction piston
140: coffee extraction filter unit Best Mode An espresso coffee extraction device according to the present invention has a structure as illustrated in FIGS. 1 to 8.

In the description of the present invention, detailed description of related functions or configurations in the art will be omitted when it is deemed that they may unnecessarily obscure the essence of the present invention.

Terms described below are defined in consideration of function of the present invention and may vary according to intents or precedents of producers, and thus these terms must be defined based on the contents of the present specification.

First, in the present invention, a coffee extractor 100 is provided to automatically extract espresso.

In particular, the coffee extractor 100 includes an extraction piston driving unit 110 to drive an extraction piston 130 to descend when coffee particles are supplied to a two-way cylinder 150 via a coffee bean grinder 101 so as to push hot water into coffee at a high pressure, thereby generating liquid coffee.

In addition, the coffee extractor 100 includes a two-way cylinder driving unit 120 to continuously extract coffee through a coffee extraction filter unit 140 and also discharge extracted coffee grounds to the outside, while moving leftward or rightward when the extraction piston driving unit 110 ascends.

More specific configuration of the present invention will be described as follows.

The extraction piston driving unit 110 according to the present invention includes vertical transfer rods 114 provided at upper ends of a cylinder driving unit body 121 and a piston driving unit body 111 assembled by a vertical transfer screw 116.

In addition, the present invention provides a piston support 112 through which the vertical transfer rods 114 and the vertical transfer screw 116 are fitted and ascending or descending by driving a vertical driving motor 115.

In addition, the piston support 112 is provided with an extraction piston 130 at the center thereof and discharge pistons 113a and 113b at opposite ends thereof.

In addition, the two-way cylinder driving unit 120 according to the present invention includes the two-way cylinder 150 that moves leftward or rightward along a horizontal transfer rod 126 and a horizontal transfer screw 123 from the cylinder driving unit body 121 by driving a horizontal driving motor 122 and is provided with a pair of injection holes 151a and 151b penetrating the inside thereof.

In addition, the cylinder driving unit body 121 according to the present invention includes a pair of discharge holes 124a and 124b to discharge extracted coffee grounds from the cylinder injection holes and the coffee extraction filter unit 140 to pass only liquid coffee therethrough, collect the liquid coffee, and discharge the collected liquid coffee via a spout.

In addition, the extraction piston 130 according to the present invention includes a hot water inflow hole 131 to supply hot water from a boiler 102 connected to a pump 103.

In addition, the extraction piston 130 is provided, therein, with a hole 132 connected to the hot water inflow hole 131 so as to allow fluid to flow therebetween.

In addition, the extraction piston 130 is provided, at a lower end thereof, with a water dispersing member 133 to spread water widely and a filter 134 to satisfactorily compress ground coffee particles so as not to come upward.

In this regard, the length of the discharge pistons 113a and 113b at the opposite ends of the piston support 112 may be larger by about 15 mm than that of the extraction piston 130 at the center thereof to discharge coffee grounds through the discharge holes 124a and 124b.

In addition, the two-way cylinder 150 according to the present invention includes a heater 153 to maintain the temperature of coffee (about 90° C. to about 98° C.) so as not to cool down when extracting coffee and a temperature sensor 154 for temperature measurement.

In addition, the coffee extraction filter unit 140 applied to the present invention includes at least one filter 141 to retain the extracted coffee grounds and pass only liquid coffee therethrough.

In addition, the filter 141 is provided, at a lower end thereof, with an extract collection member 142 to collect the liquid coffee and discharge the collected liquid coffee via a coffee extraction hose 144.

In addition, the extract collection member 142 is provided, at a lower end thereof, with a fixing member 143 to fix the extract collection member 142 and facilitate cleaning during maintenance.

In addition, the horizontal transfer screw 123 applied to the present invention is provided with at least one connection part 152 connected to the two-way cylinder 150 to horizontally transfer the two-way cylinder 150.

Meanwhile, the above-described embodiments of the present invention may be variously modified and take many different forms.

In addition, it should be understood that the present invention is not construed as limited to the particular forms set forth in the detailed description, and includes all changes, equivalents, and substitutes that do not depart from the spirit and scope of the present invention as defined by the appended claims.

Operational effects of the espresso coffee extraction device of the present invention having the above-described structure will now be described as follows.

First, the present invention is aimed to automatically extract coffee with the same quality as that of espresso manually extracted by baristas.

In particular, the present invention uses an espresso extraction principle.

That is, espresso is a small amount of essence coffee that is traditionally drunk by Italians and is extracted by a pressurized-type extraction method whereby ground coffee is put in a metal filter and packed therein by applying pressure, and hot water is passed through the packed coffee at a high pressure to thereby extract one or two shots of espresso within a short time.

In particular, a method of manually extracting espresso using a traditional Italian machine is widely used, but, according to the extraction principle of the present application, espresso may be automatically extracted using a cylinder and a piston that readily and automatically operate and coffee with the same quality as that of coffee extracted by a traditional hand-operated machine may be produced.

Figure 1:
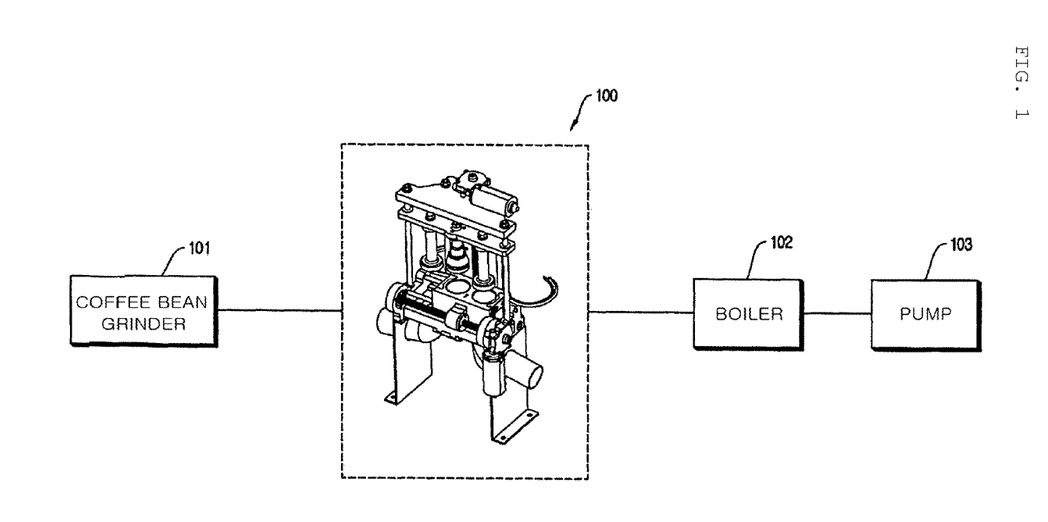
FIG. 1 is a structural diagram of an espresso coffee extraction device according to the present invention.
Figure 2:
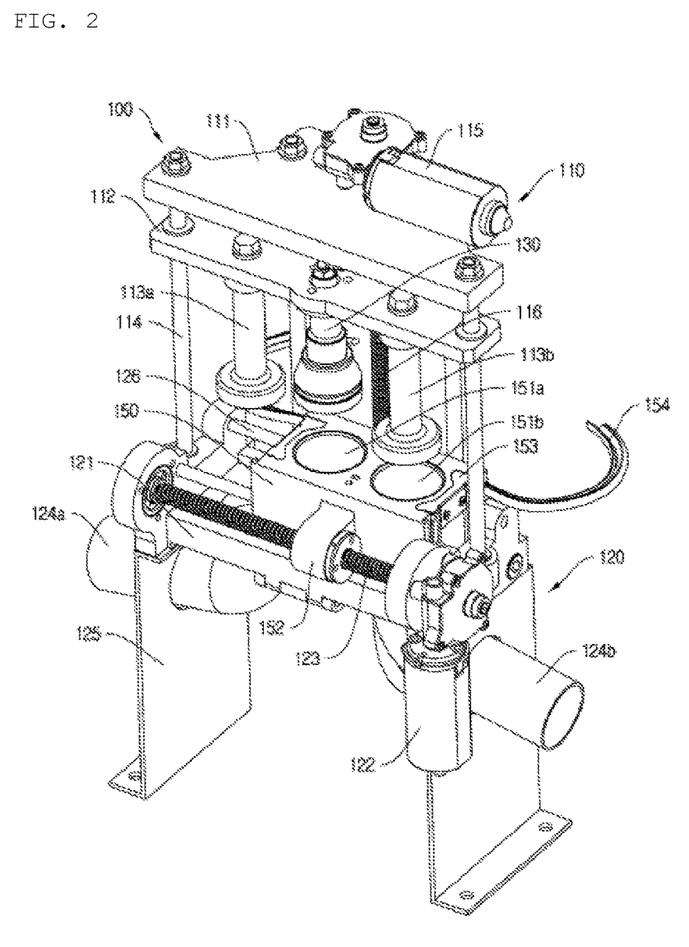
FIG. 2 is a perspective view illustrating a state before an extraction piston of the espresso coffee extraction device according to the present invention descends.
Figure 3:
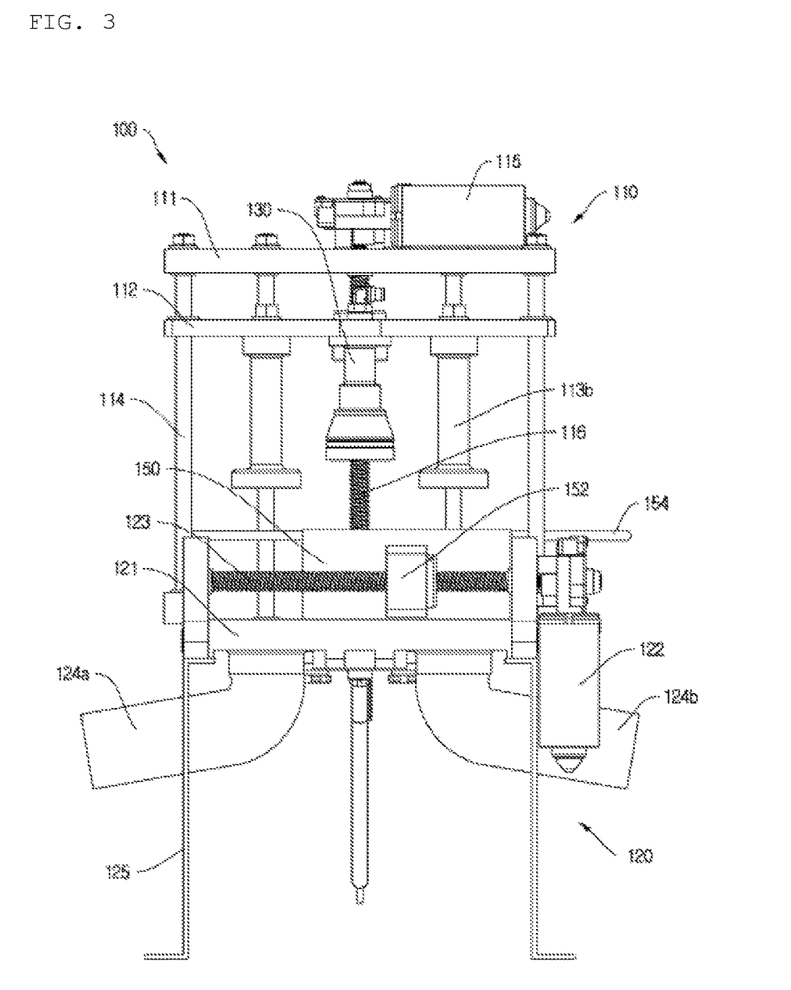
FIG. 3 is a front view of FIG. 2.

FIG. 2 is a perspective view illustrating a state before an extraction piston of an espresso coffee extraction device according to the present invention descends. FIG. 3 is a front view of FIG. 2. The above-described extraction method is performed by the extraction piston driving unit 110.

That is, the vertical transfer screw 116 is rotated by driving the vertical driving motor 115 and, accordingly, the piston support 112 ascends or descends along the vertical transfer rods 114 and, consequently, the extraction piston 130 at the center of the piston support 112 and the discharge pistons 113a and 113b at the opposite ends thereof move upward or downward.

Figure 6:
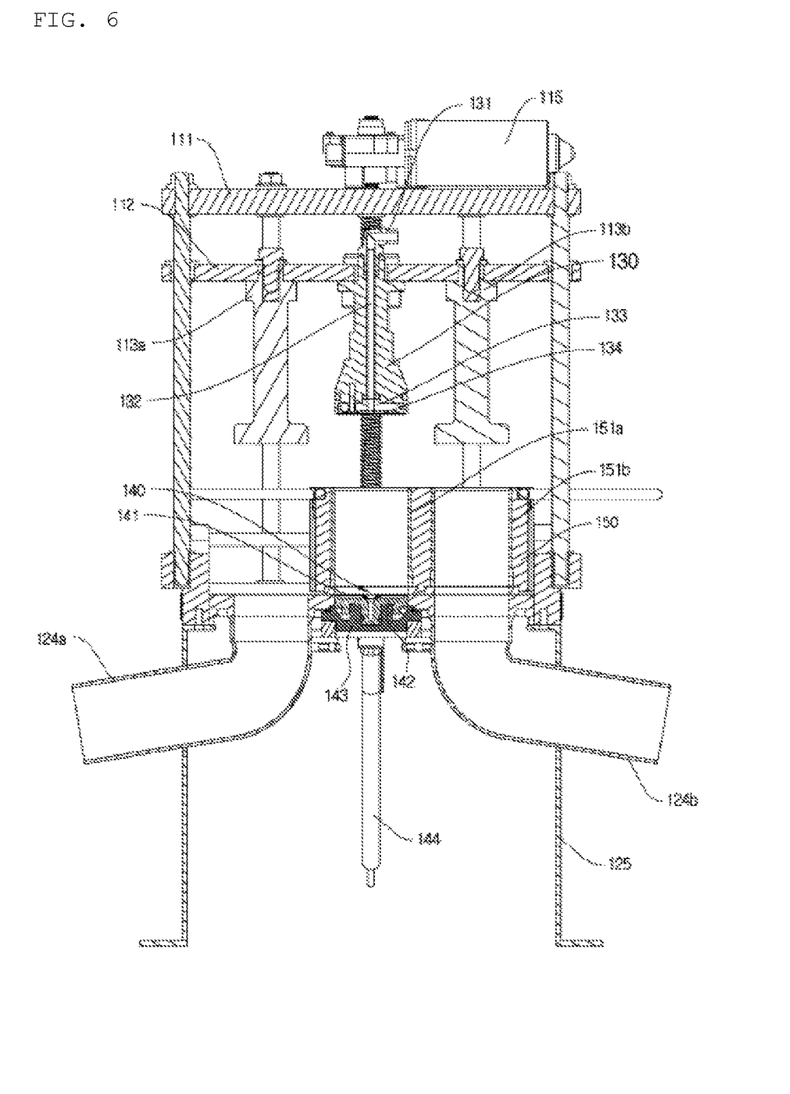
FIG. 6 is a cross-sectional view illustrating a state before the extraction piston of the espresso coffee extraction device according to the present invention descends.

FIG. 6 is a cross-sectional view illustrating a state before the extraction piston of the espresso coffee extraction device according to the present invention descends.

In the state illustrated in FIGS. 2, 3, and 6, fine coffee particles are added to an injection hole 151a on the left side of the two-way cylinder 150 through the coffee bean grinder 101.

Figure 4:
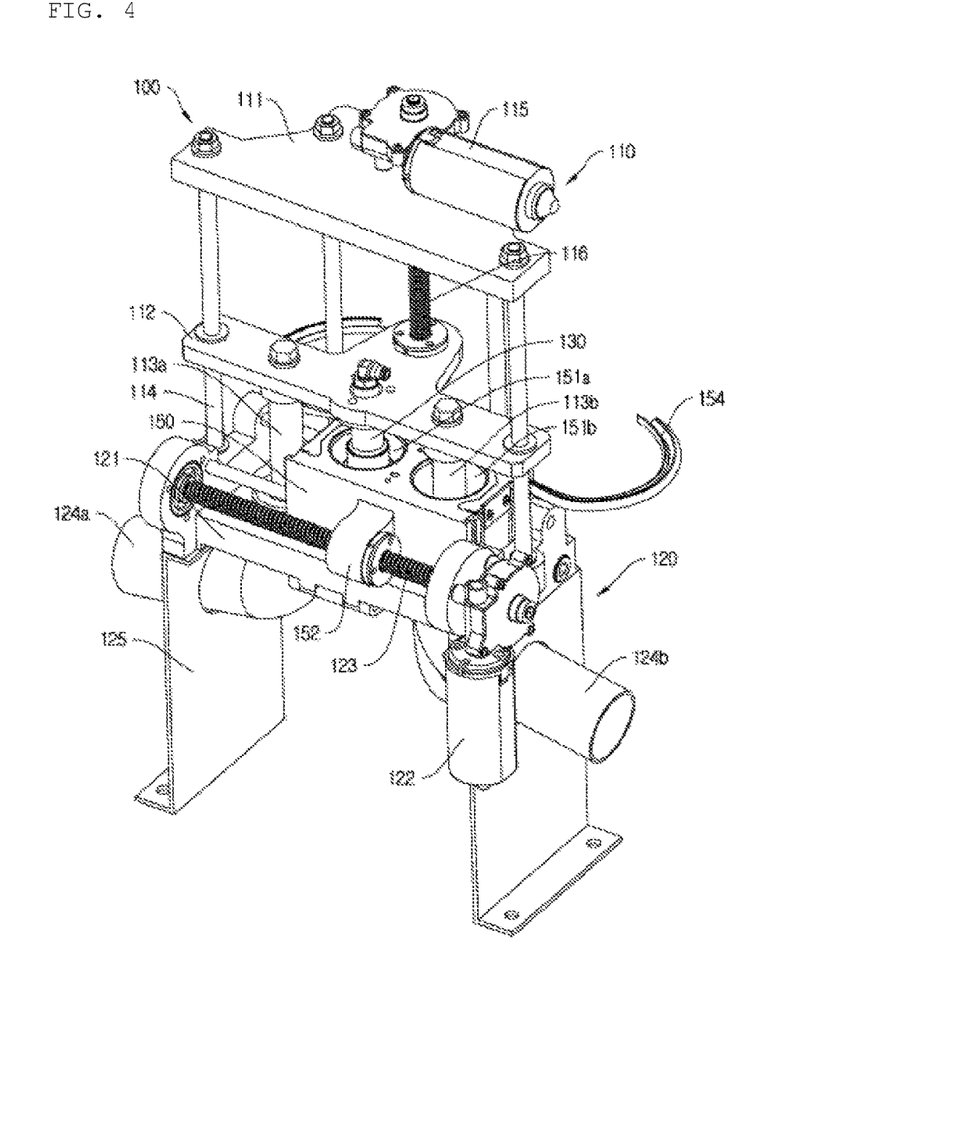
FIG. 4 is a perspective view illustrating a state in which the extraction piston of the expresso coffee extraction device according to the present invention is lowered.
Figure 5:
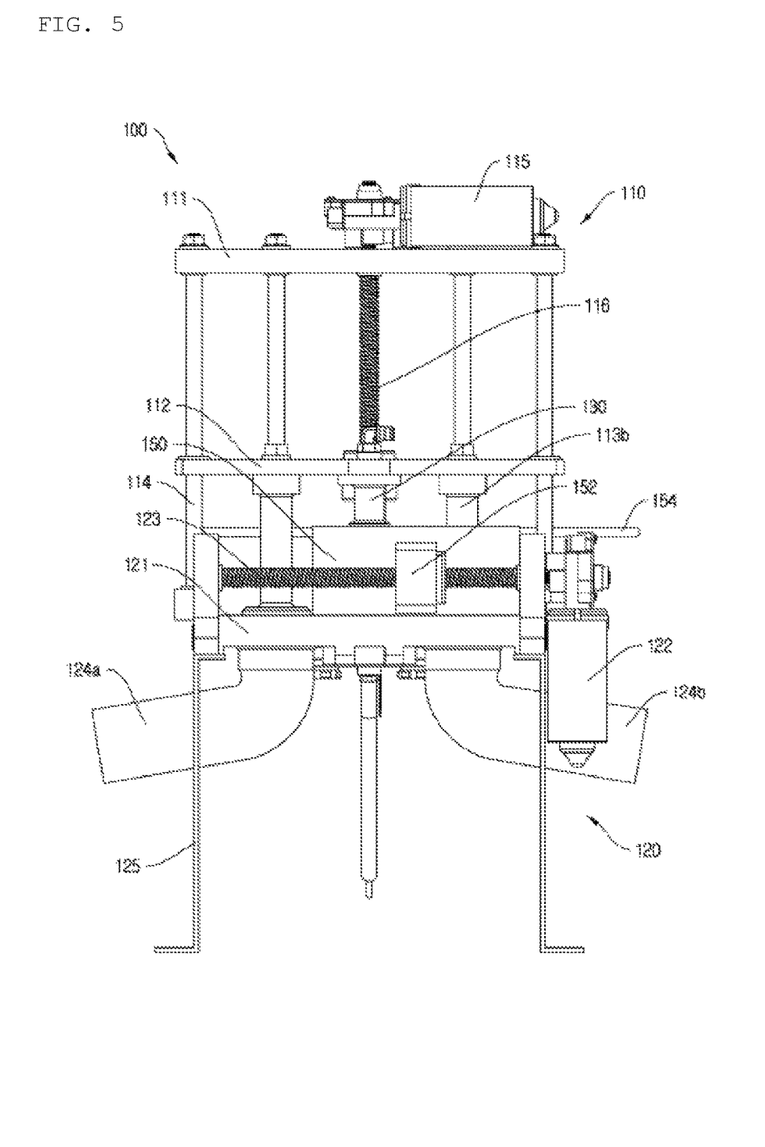
FIG. 5 is a front view of FIG. 4.

Subsequently, the piston support 112 is lowered by driving the vertical driving motor 115 and operation of the extraction piston driving unit 110. FIG. 4 is a perspective view illustrating a state in which the extraction piston of the espresso coffee extraction device according to the present invention is lowered. FIG. 5 is a front view of FIG. 4.

Figure 7:
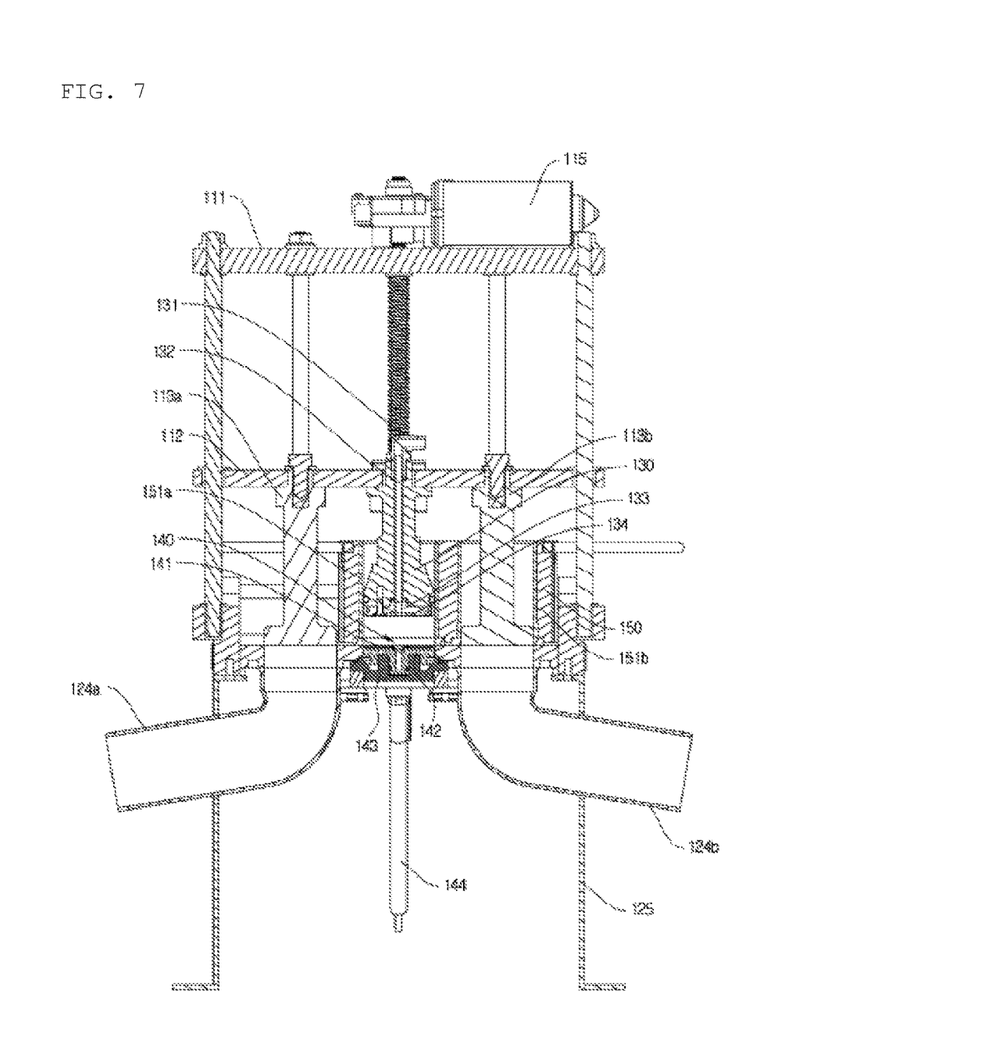
FIG. 7 is a cross-sectional view illustrating a state in which the extraction piston of the expresso coffee extraction device according to the present invention is lowered.

FIG. 7 is a cross-sectional view illustrating a state in which the extraction piston of the espresso coffee extraction device according to the present invention is lowered. When the extraction piston 130 descends to a predetermined position of the inside of the injection hole 151a of the two-way cylinder 150, hot water is supplied to coffee via the boiler 102 connected to the pump 103, the hot water inflow hole 131, the hole 132, the water dispersing member 133, and the filter 134.

After a small amount of hot water is supplied as described above, the extraction piston 130 descends by about 5 mm to about 10 mm, and then starts to push the hot water by applying pressure.

When the water supplying process (about 20 seconds) is completed as described above, the extraction piston 130 further descends by about 5 mm, packs coffee, and then moves upward.

In addition, the two-way cylinder 150 applied to the present invention maintains the temperature of coffee at about 90° C. to about 98° C. at all times so as not to cool down, and appropriately maintains the temperature by using the temperature sensor 154.

In addition, the compressed coffee as described above is discharged as liquid coffee via the coffee extraction filter unit 140, and the liquid coffee is collected by the filter 141 and the extract collection member 142 and then discharged to the outside via the coffee extraction hose 144.

In this regard, the fixing member 143 may fix the extract collection member 142 and also be detached when maintenance and cleaning are performed.

In the present invention, when the extraction piston 130 and the discharge pistons 113a and 113b descend, the discharge pistons 113a and 113b, which are longer by about 15 mm than the extraction piston 130, push coffee grounds inside the injection hole 151a, upon which extraction has been previously completed, to discharge the coffee grounds via the discharge holes 124a and 124b.

Meanwhile, the two-way cylinder driving unit 120 applied to the present invention operates as follows.

In the present invention, when the horizontal transfer screw 123 is rotated by driving the horizontal driving motor 122, the two-way cylinder 150 connected to the connection part 152 horizontally moves along the horizontal transfer rod 126, together with the connection part 152, and the above-described injection holes 151a and 151b are selectively positioned at upper ends of the coffee extraction filter unit 140.

That is, in the present invention, the two-way cylinder 150 moves to the left side as viewed in the drawings as the extraction piston 130 moves upward, and the injection hole 151b of the two-way cylinder 150 is positioned at the center.

Figure 8:
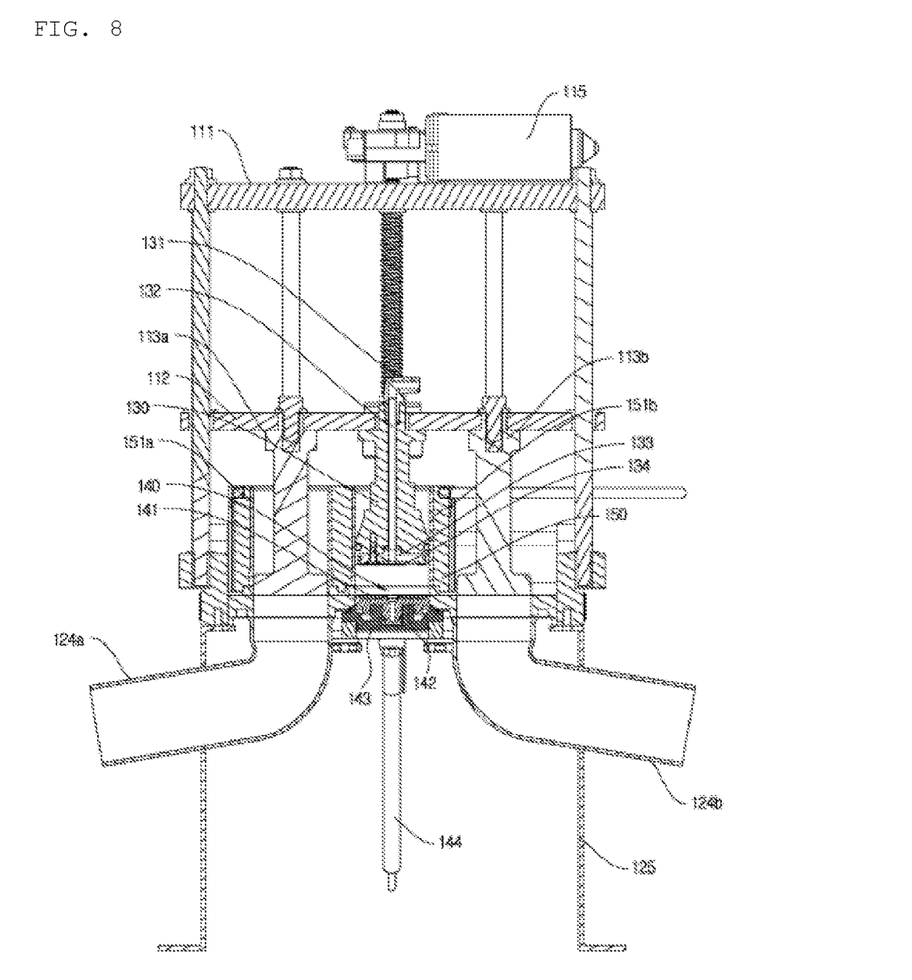
FIG. 8 is a cross-sectional view illustrating a state in which the extraction piston is lowered in a state where a two-way cylinder of the espresso coffee extraction device according to the present invention moves to one side.

This will now be described in further detail. FIG. 8 is a cross-sectional view illustrating a state in which the extraction piston is lowered in a state where the two-way cylinder 150 of the espresso coffee extraction device according to the present invention moves to one side, i.e., the left side. The above-described operations are continuously and repeatedly performed.

The two-way cylinder 150 applied to the present invention may include cylinders and pistons having different sizes according to extraction machines combined for industrial, commercial, or home use, and the like, and thus the two-way cylinder 150 and the extraction piston 130 may be manufactured in various sizes according to application.

In addition, the two-way cylinder 150 is securely fixed and moves only horizontally, and thus malfunction due to a gap or shaking may be completely prevented.

INDUSTRIAL APPLICABILITY

The technical idea of the espresso coffee extraction device according to the present invention is that high repeatability may be obtained in practice. In particular, technical advances are accelerated by carrying out the present invention as described above, which contributes to industrial development, and thus the present invention has sufficient value to be protected.

The invention claimed is:

1. An espresso coffee extraction device comprising a coffee extractor comprising:
    an extraction piston driving unit to drive an extraction piston to descend when coffee particles are supplied to a two-way cylinder via a coffee bean grinder to push hot water into coffee at a high pressure, thereby generating liquid coffee; and
    a two-way cylinder driving unit to continuously extract coffee via a coffee extraction filter unit and discharge extracted coffee grounds to the outside, while moving leftward or rightward when the extraction piston driving unit ascends.

2. The espresso coffee extraction device of claim 1, wherein:
    the extraction piston driving unit comprises:
        vertical transfer rods provided at upper ends of a cylinder driving unit body;
        a piston driving unit body assembled by a vertical transfer screw;
        a piston support through which the vertical transfer rods and the vertical transfer screw are fitted and ascending or descending by driving a vertical driving motor; and
        the extraction piston provided at a center of the piston support and discharge pistons and provided at opposite ends thereof, and the two-way cylinder driving unit comprises:
    a two-way cylinder moving leftward or rightward along a horizontal transfer rod and a horizontal transfer screw from the cylinder driving unit body by driving a horizontal driving motor and provided with a pair of injection holes and penetrating the inside thereof; and
    a pair of discharge holes and to discharge extracted coffee grounds from the cylinder injection holes and the coffee extraction filter unit to pass only liquid coffee therethrough, collect the liquid coffee, and discharge the collected liquid coffee via a spout, the discharge holes and and the coffee extraction filter unit being provided at the cylinder driving unit body.

3. The espresso coffee extraction device of claim 2, wherein the extraction piston comprises:
    a hot water inflow hole to supply hot water from a boiler connected to a pump;
    a hole provided inside of the extraction piston and connected to the hot water inflow hole so as to allow fluid to flow therebetween; and
    a water dispersing member to spread water widely and a filter to satisfactorily compress ground coffee particles so as not to come upward, the water dispersing member and the filter provided at a lower end of the extraction piston.

4. The espresso coffee extraction device of claim 2, wherein the discharge pistons and are longer than the extraction piston to discharge the coffee grounds via the discharge holes.

5. The espresso coffee extraction device of claim 2, wherein the two-way cylinder comprises:
    a heater to maintain a temperature of coffee so as not to cool down when extracting coffee; and
    a temperature sensor to measure the temperature.

6. The espresso coffee extraction device of claim 2, wherein the coffee extraction filter unit comprises:
    at least one filter to retain the extracted coffee grounds and pass only liquid coffee therethrough;
    an extract collection member provided at a lower end of the filter to collect the liquid coffee and discharge the collected liquid coffee via a coffee extraction hose; and
    a fixing member provided at a lower end of the extract collection member to fix the extract collection member and facilitate cleaning during maintenance.

7. The espresso coffee extraction device of claim 2, wherein the horizontal transfer screw is provided with at least one connection part connected to the two-way cylinder to horizontally transfer the two-way cylinder.

* * * * *